INVENTOR.
BERTIL G. WINSTROM
BY
Andrus & Starke
Attorneys

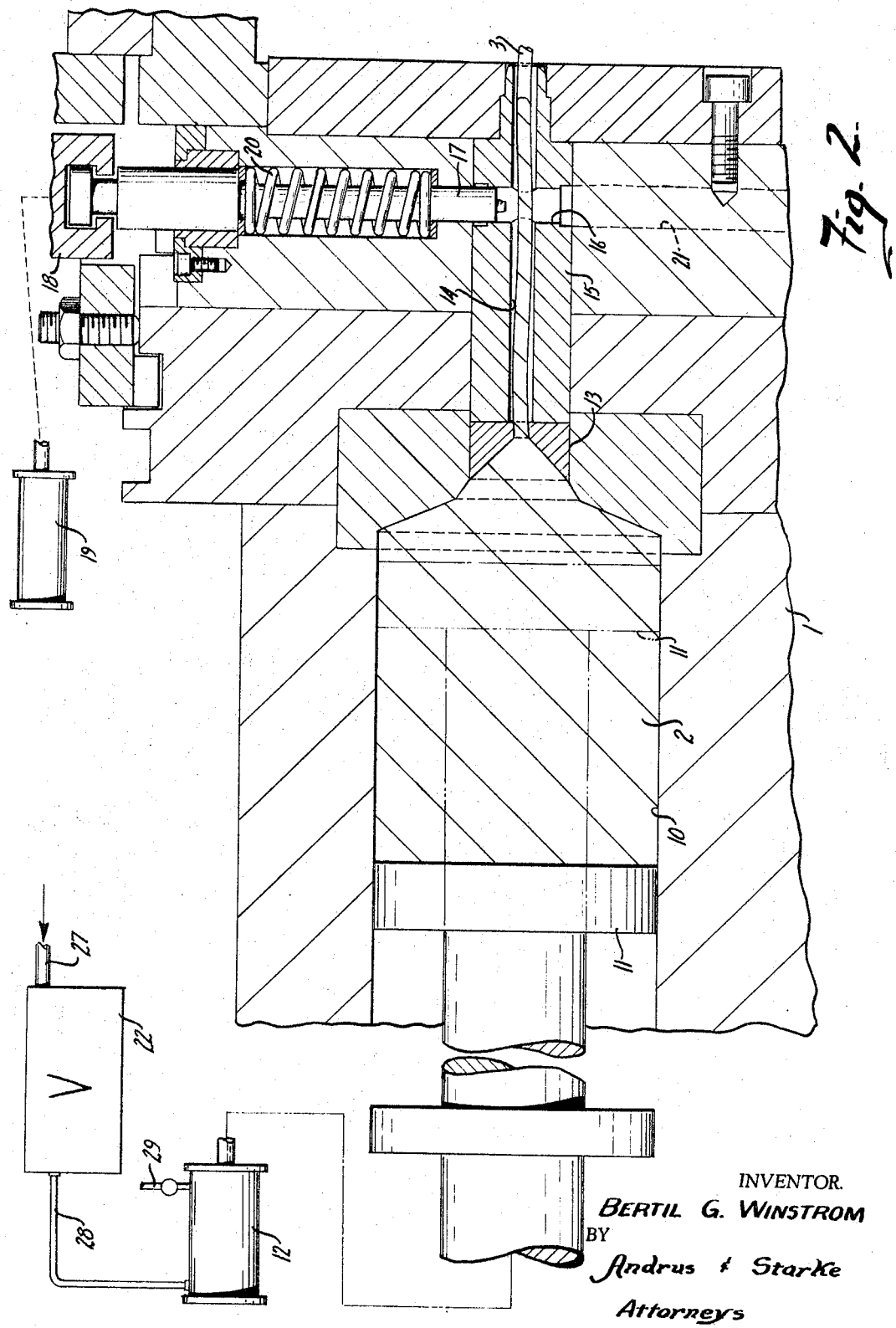

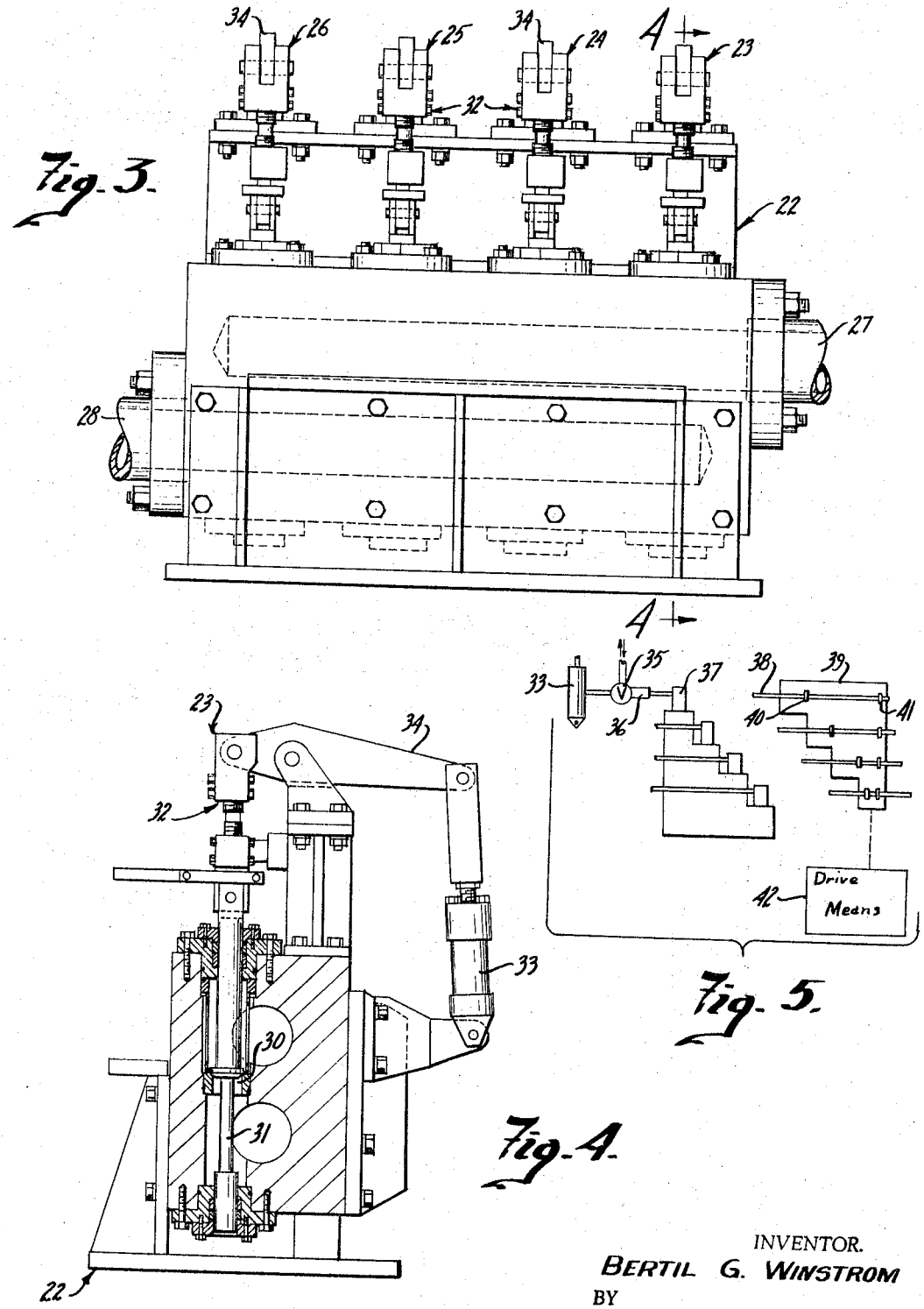

INVENTOR.
BERTIL G. WINSTROM
BY Andrus & Starke
Attorneys

INVENTOR.
BERTIL G. WINSTROM
BY
Andrus & Starke
Attorneys

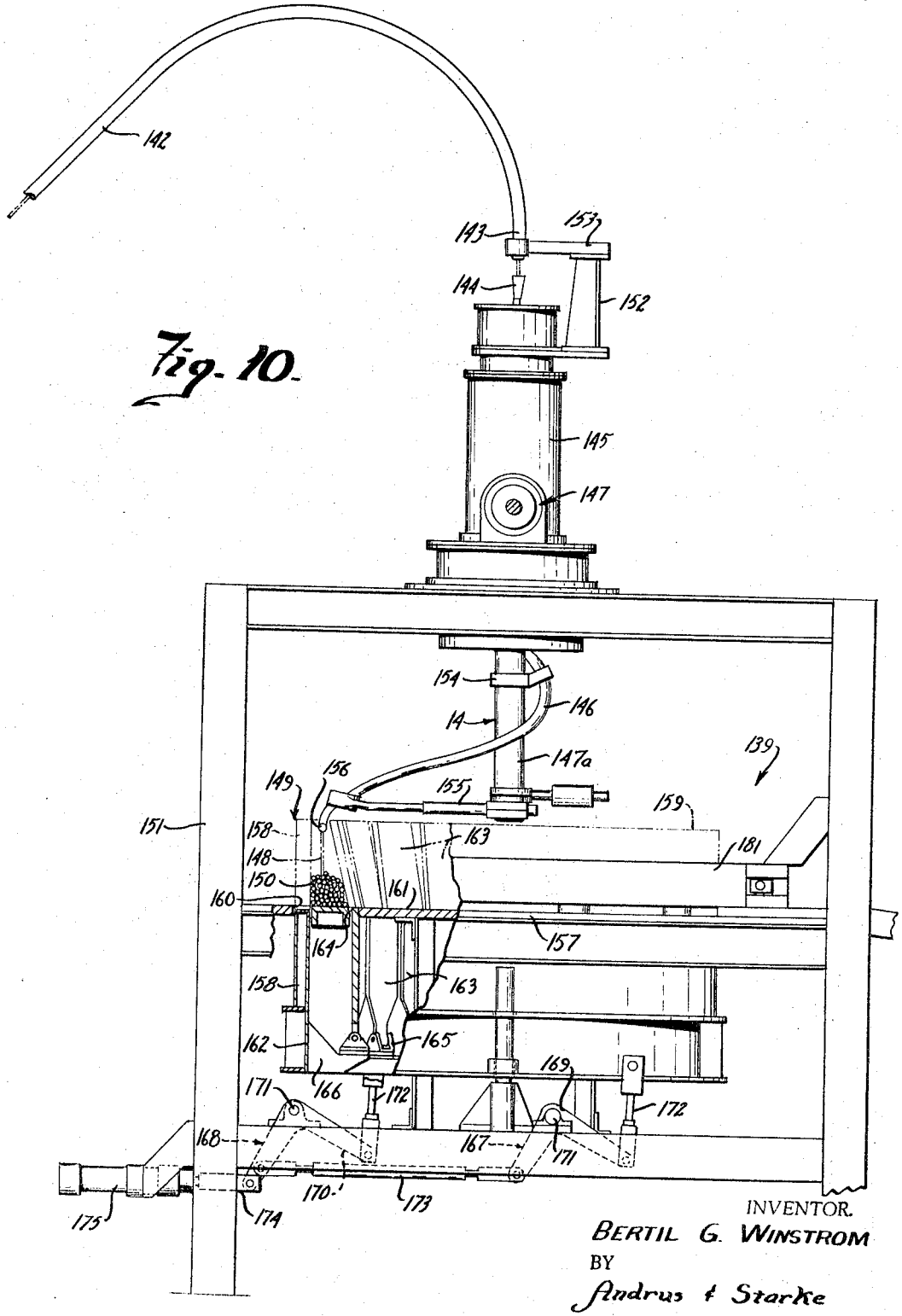

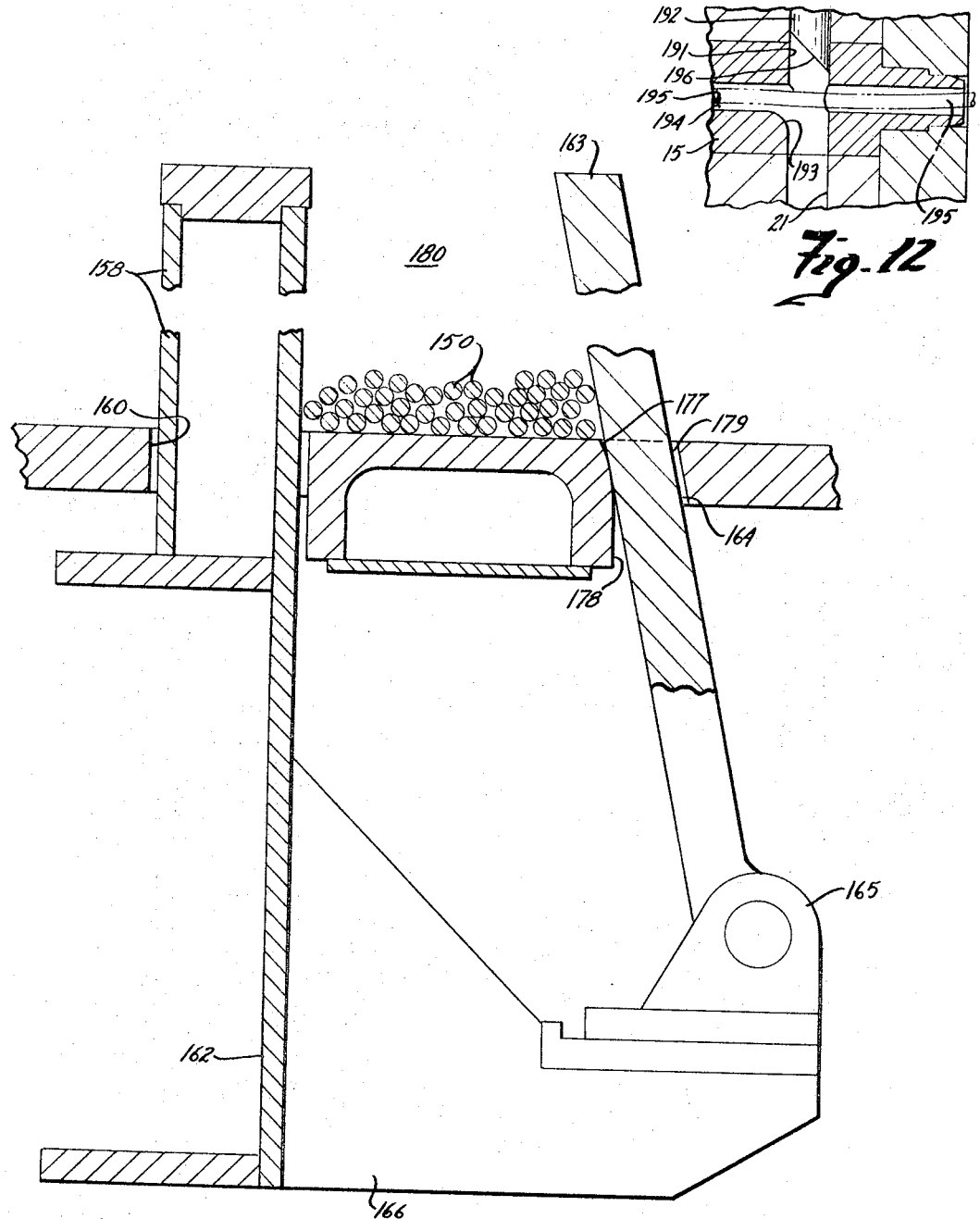

United States Patent Office 3,339,395
Patented Sept. 5, 1967

3,339,395
HIGH SPEED METALLIC EXTRUSION
APPARATUS
Bertil G. Winstrom, Mequon, Wis., assignor to A. O.
Smith Corporation, Milwaukee, Wis., a corporation of
New York
Filed Feb. 17, 1964, Ser. No. 345,194
10 Claims. (Cl. 72—257)

This invention relates to a high speed metallic extrusion method and apparatus and particularly the extrusion of a hot metal billet into a wire-like member which is coiled simultaneously with the extrusion thereof.

Wire-like elements have been formed by hot extrusion of metal billets through a suitable extrusion die. Problems with twisting and curling of the extruded wire have been encountered in the formation of relatively long extruded members and various supporting and profile correcting devices have been suggested. A particularly simple and effective apparatus for the extrusion of long metal members is disclosed in applicant's copending application Ser. No. 180,132 which was filed on Mar. 16, 1962, and is now Patent No. 3,181,334, entitled, Extrusion Apparatus. In that apparatus, a channel-shaped guide member is provided as a runout for the extruded metal. Although the apparatus provides a very high speed method of providing relatively long extruded wire-like metal members, the extrusion as a continuous straight length requires a substantial floor space and accurate control.

The present invention is particularly directed to an extrusion apparatus for extruding of relatively long lengths of metal wire-like members and simultaneously winding the extruded wire-like member into a coil on a suitable coil support. A conveyor system may be interconnected with the winding mechanism and support to provide for automatic discharge and transfer of the coiled extruded wire-like member for subsequent processing.

In accordance with the present invention, the hot extruded wire-like member is fed into a rotatable wind-up guide which directs the hot metal member directly onto a supporting mandrel or the like. The mandrel may be disposed in either a vertical or horizontal axis. In accordance with conventional extrusion processes, the complete billet is never completely extruded but a very small portion of the billet remains in the container after the completed movement of the extrusion press. As a result, the wire must be severed from this remaining portion of the billet and the remainder of the extruded wire then wound into the coil member. Further, the time allowed to sever the wire from the billet should be extremely small to prevent substantial cooling of the wire and the reduction of the viscosity or plasticity of the wire to allow relatively ready coiling of the wire.

The present invention provides an improved winding and cutting mechanism allowing rapid extrusion of high quality wire-like elements into a coil. In accordance with the present invention, the wire coiling guide or spinner is of a relatively low mass such that it has little or essentially no inertia. The spinner is driven by a suitable drive unit, and a hydraulic type drive unit, having at least the following two characteristic outputs; a high-speed, low-torque drive or, alternatively, a low-speed, high-torque drive. During the extrusion of the billet from the extrusion press, the spinner is driven at a relatively high speed and low torque. Actually, the output speed may be somewhat less than that caused by the movement of the wire through the spinner. At the end of the extrusion movement of the press, the spinner is rapidly brought to a halt and the extruded wire is severed from the billet. The spinner is then driven initially at a low speed but relatively high torque to bring it rapidly to a high rotating speed. Thereafter, the spinner is driven at a high-speed, low-torque characteristic to increase the winding speed and to actually effect a throwing of the terminal end of the extruded wire-like member onto the coil form.

In accordance with another feature of the present invention, the wire-like member is severed from the billet by a flying type shear. In accordance with this aspect of the present invention, a cutting mechanism is integrally formed with the extrusion passageway from the die such that the knife portion may be traversed or moved laterally through the extrusion passageway without separation of the die or opening of the mechanism to allow insertion of a cutting mechanism.

In accordance with the present invention, in combination with the coiler, it is highly important that a very accurate and closely regulated control of the extrusion press is employed for optimum output and quality of the extruded wire-like member. In accordance with another feature of the present invention, a multiple port spindle valve is provided with the valve members connected in series. The opening and closing of the valves is controlled by a plurality of cams driven from a common source with the cam contour determining the successive changes in the positioning of the valve. This has been found to provide a very highly reliable and accurate method of controlling the rate of extrusion and permitting correlation with the movement of the spinner and the coiling of the wire onto a form.

In accordance with still another aspect of the present invention, a pair of winding devices is provided and disposed in side-by-side relation to the outlet or discharging side of a single press. A transfer mechanism is provided including a pair of transfer guide tubes selectively connecting the output of the extrusion press with the two winding mechanisms. This feature of the present invention is particularly useful in combinaiton with an automatic conveying mechanism whereby during the coiling upon one unit, the coiled extrusion in the other unit can be discharged onto the conveyor for movement to a subsequent processing or storage position.

The present invention thus provides a very highly efficient and rapid means for extruding a wire-like member into a coil. The invention is applicable to carbon-steel wire and the like as well as to other conventionally extruded metals.

The drawings furnished herewith illustrate the best mode presently contemplated for carrying out the invention.

In the drawings:

FIG. 2 is an enlarged vertical section taken through the extrusion die and the extrusion shearing apparatus of the extrusion press;

FIG. 3 is an elevational view of a valve unit for controlling the rate of extrusion;

FIG. 4 is a vertical section taken on line 4—4 of FIG. 3 and showing details of the valve unit;

FIG. 5 is a diagrammatic illustration of valve control means for varying the output of the valve unit shown in FIGS. 3 and 4;

FIG. 10 is an enlarged side elevational view of a portion of FIG. 9;

FIG. 11 is an enlarged fragmentary vertical section through FIG. 10; and

FIG. 12 is a fragmentary view showing an alternative shear mechanism which can be employed in connection with this invention.

Figure 1:
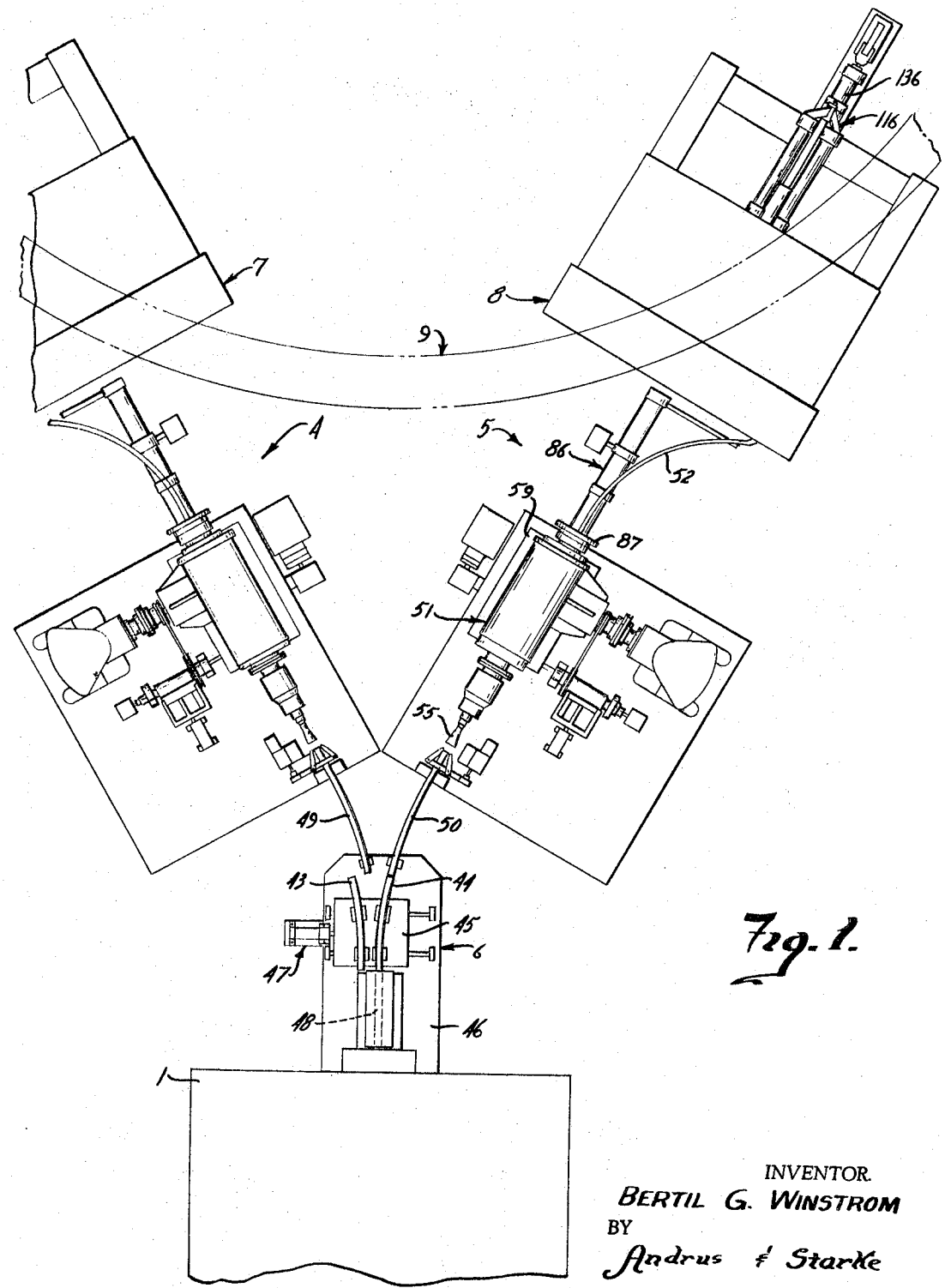
FIG. 1 is a top elevational view of an extruding and extrusion winding apparatus constructed in accordance with the present invention.

Referring to the drawings and particularly to FIGS. 1 and 2, the extruding and coiling assembly illlustrated includes an extrusion press 1 adapted to receive a billet 2 heated to a predetermined plasticity or viscosity for extrusion into a continuous length of a wire 3. A pair of coil winding assemblies 4 and 5 is disposed in side-by-side relation spaced slightly from the discharge end of the extrusion press 1 to alternately receive the wire 3 being then extruded. A transfer unit 6 is interposed between the discharge end of the extrusion press 1 and the inlet end of the winding assemblies 4 and 5 to effect an alternate direction of the extruded wires to the winding assemblies 4 and 5. Coil mandrels 7 and 8 are mounted adjacent the discharge end of the winding assemblies 4 and 5 respectively and serve to support and provide a winding form for the hot extruded metal which is discharged from the winding assemblies 4 and 5. An overhead conveyor unit 9 moves in the path of the mandrels 7 and 8, as hereinafter described, to remove an extruded coil and move it for subsequent processing, storage or the like.

In operation, the transfer unit 6 is set to align and connect one of the coil winding assemblies 4 or 5 with the discharge of the extrusion press 1. The extrusion press 1 is then actuated to extrude the heated billet 2 into the wirelike element or wire 3 which moves through the corresponding winding assembly and is wound on the related coil mandrel 7 or 8. During this winding operation, a previously wound coil in the opposite winding assembly is transferred to the overhead conveyor 9.

Referring particularly to FIG. 2, the illustrated extrusion press 1 includes a billet chamber 10 within which the heated billet 2 is disposed, in any suitable manner, not shown. A ram 11 is slidably mounted with respect to the chamber 10 and is coupled to a hydraulic cylinder piston unit 12 for selective positioning behind the chamber 10 and for movement through the chamber 10. Ram 11 is completely withdrawn from the chamber 10 and the heated billet 2 inserted into the chamber by automatic loading device, not shown. The cylinder-piston unit 12 is then actuated to cause the ram 11 to move into the chamber 10, engage the back end of the billet 2 and force it forwardly through an extrusion die 13 having an opening corresponding to the desired diameter of the wire 3 and mounted in and forming a forward closure of the discharge end of the billet chamber 10.

In the illustrated embodiment of the invention, a discharge and shearing passageway 14 of somewhat greater diameter than the opening in the extrusion die 13 is provided in a guide tube 15 which is clamped abutting against the discharge face of the extrusion die 13. The extruded wire 3 is led therefrom into the transfer unit 6, as more fully described hereinafter.

In accordance with the present invention, a shear opening or passageway 16 is provided extending perpendicular and transversely through the discharge and shearing passageway 14. A vertical shear 17 is slidably journaled in the opening 16 and is engaged at its outer end by a piston rod 18 forming the output of a hydraulic cylinder assembly 19. The piston rod 18 is slidably journaled for vertical movement and is biased or urged into a retracted position by a return spring 20 encircling the extended portion of the vertical shear 17. Spring 20 acts between piston rod 18 and the base of the recess for shear 17 to continuously urge the vertical shear upwardly in spaced relation to the discharge and shearing passageway 14. A slug opening 21 is formed in the opposite side of passageway 14 and aligned with shear 17.

In operation, the ram 11 is caused to move into the billet chamber 10 to extrude the greater portion of the heated billet 2. The forward portion of the ram 11 is shown in dotted outline for illustrative purposes. Immediately coincident with the movement of the ram to that position, the vertical shear 17 is actuated to reciprocate rapidly through the pasageway 16 and sever the extruded wire 3 from the heated billet 2 with the slug severed from wire 3 discharged through the slug opening 21. Immediately thereafter, the winding of extruded wire 3 is completed. The ram 11 may then be moved rearwardly and the heated billet 2 is drawn outwardly of the chamber 11. This avoids the necessity for separating any of the die components in the extrusion press to allow introduction of a shearing apparatus such as generally employed in the structures heretofore known.

The control of the rate of movement of the ram 11 for optimum extrusion of the wire 3 is of significance. A highly reliable control unit 22 for the hydraulic cylinder 12 and ram 11 may include four similar spindle valves 23, 24, 25 and 26, respectively, all of which are connected in parallel output circuit between a pressure fluid source line 27 and an output or drive feed line 28 which is connected to cylinder 12 to move the ram 11 into chamber 10 and force the billet 2 through the die 13, as shown in FIGS. 3–5. The ram 11 is withdrawn by a separately valved line 29 connected to the opposite end of cylinder 12. The valves 23–26 are similarly controlled and consequently the structure of valve 23 is described in detail in connection with FIGS. 3–5.

The valve 23 includes a port 30 connecting passageways connected respectively to the source line 27 and the feed line 28. A spindle 31 is mounted for vertical movement nad includes a valve member 32 for selectively opening and closing the port 29. The spindle 31 is adjustably connected as at 32 to a positioning cylinder means 33 by a linkage 34. The spacing of member 32 from port 30 is preset to provide a selected volumetric flow to cylinder 12 which, in turn, controls the rate that the ram 2 moves.

The several valves 23–26 are variously preset and sequentially operated to produce the desired rate of movement in any suitable manner; for example, as diagrammatically shown in FIG. 5.

An electromagnetic pilot valve 35 connects the positioning cylinder means 33 to a suitable control fluid source, not shown. The coil 36 of valve 35 is connected to a power source, not shown, by a switch 37 which is selectively closed by a switch actuating rod 38. A common drive plate 39 has the rods for the several valves 23–26 adjustably secured thereto by suitably spaced clamps 40 and 41 or the like and is connected to a suitable drive means 42 for positioning with respect to the switches 37 for timed actuation thereof in accordance with the position of ram 11.

The wire 3 as it emits or flows from the extrusion press 1, passes through either of a pair of transfer tubes 43 and 44 of the transfer mechanism or unit 6. The transfer tube 43 is associated with the winding assembly 4 and has a rectilinear or input portion aligned with the discharge end of the press 1 and a laterally gradually curving portion terminating adjacent the winding assembly 4. Transfer tube 44 is similarly constructed but curves in the opposite direction to the input of the winding assembly 5. The transfer tubes 43 and 44 are secured to a common positioning plate 45 movably mounted on a base 46 for selective transverse movement with respect to the extrusion press. A hydraulic positioning device 47 is shown coupled to the common support 45 to selectively align the tubes 43 and 44 with a discharge tube 48 from extrusion press 1 for guiding of the extruded wire 3 to the corresponding winding assemblies 4 and 5; and particularly to a bridging or input tube 49 of winding assembly 4 or a bridging tube 50 of winding assembly 5.

Each of the winding assemblies 4 and 5 and the corresponding winding mandrels 7 and 8 are similarly constructed. The winding assembly 5 and the mandrel 8 will be described hereinafter in detail with corresponding elements of assembly 4 and mandrel 7 similarly numbered with superscript primes added thereto to distinguish therebetween.

The illustrated winding assembly 5 includes a drive portion 51 through which the extruded wire 3 is pushed. A tubular curved winding spinner 52, which is most clearly shown in FIG. 7, projects axially and radially from the drive portion 51 and terminates in a discharge end nozzle 53 which is located and moves in a vertical plane extending transversely with respect to the rotational axis of the spinner 52. Drive portion 40 rotates spinner 52, as hereinafter described, simultaneously with the extrusion of the hot plastic extruded wire 3 through the winding spinner 52 such that the extruded wire 3 is forced from the spinner and wound onto the aligned mandrel 8. As previously noted, the wire 3 is extruded from a substantial portion of billet 2 and simultaneously the greater portion is wound on the mandrel 8. At the end of the extrusion, wire 3 is severed from the butt portion and the winding operation is then again started to complete winding of the extruded wire 3 upon the mandrel 8.

In accordance with the present invention, the drive of the winding spinner 52 is regulated such that during the extrusion process prior to the severing of the wire 3 from the billet 2, the drive portion 51 establishes a high-speed, low-torque drive. The speed of spinner 52 tends to be somewhat higher than the extrusion speed of the wire and maintains a slight tension on the extrusion. However, the tension force created by the spinner 52 is not great enough to pull the wire from the billet. At the end of the extrusion, the movement of the billet and the wire stops and the spinner also stops, as a result of the low torque drive.

Immediately following severing of the wire 3 from the billet, the drive to the spinner 52 is changed to the relatively slow-speed, high-torque input from the drive portion 51. This pulls the wire 3 from the extrusion press 1 and slowly winds it upon the mandrel 7. As the winding of the terminal end of the wire 3 approaches, the drive portion 51 is switched to a high-speed, low-torque input to increase the rotational speed of the spinner 52 such that the terminal end of the wire 3 is thrown from the winding arm onto the mandrel 8 to complete the winding of the extruded wire onto the mandrel. The coil is then transferred to the conveyor 9.

Figure 6:
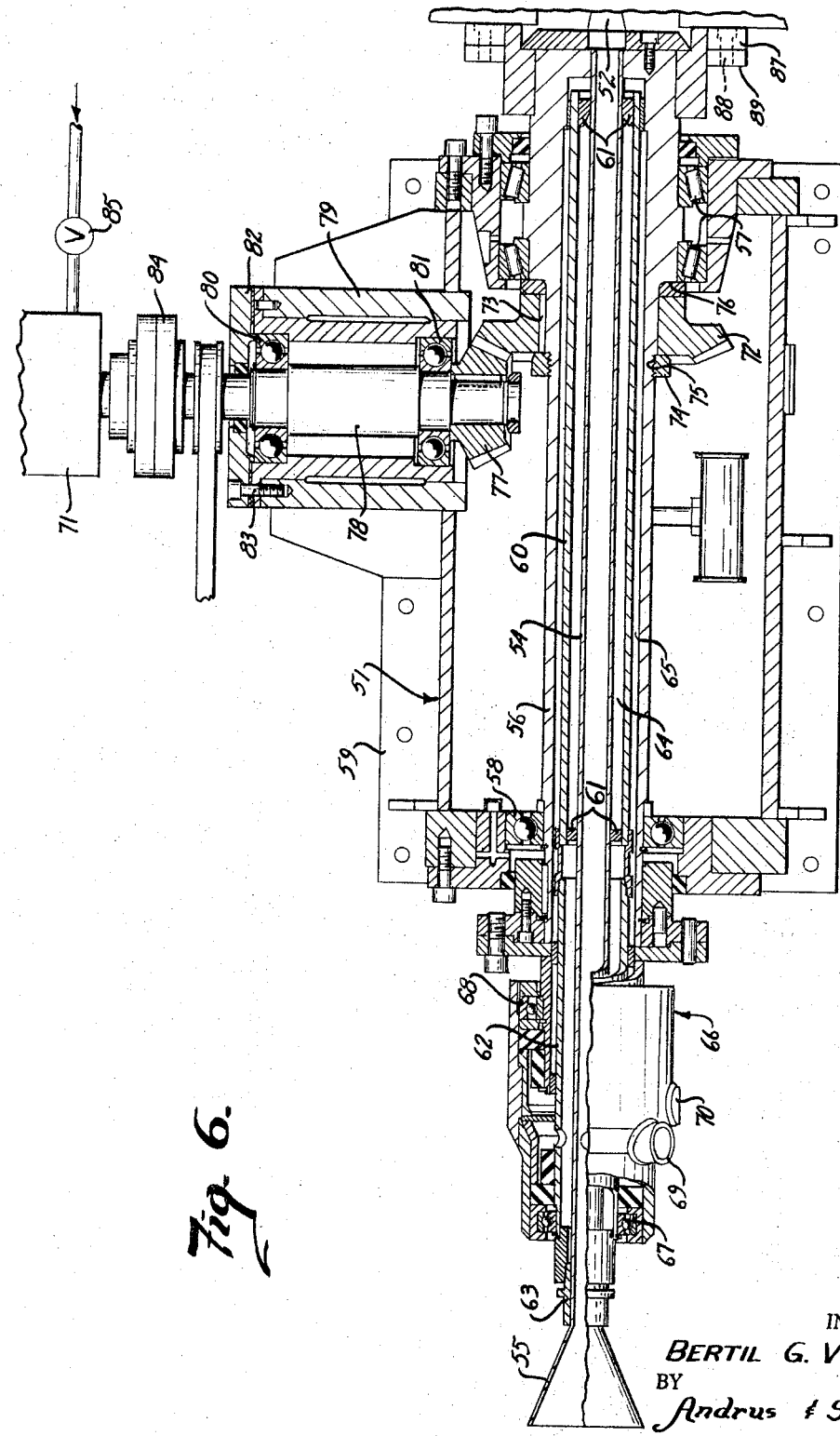
FIG. 6 is a top elevational view with parts broken away and sectioned through the drive and input guide of the winding apparatus shown in FIG. 1.

Referring particularly to FIG. 6, drive portion 51 of a suitable construction for the winding assembly 5 includes a guide tube 54 having a funnel or cone-shaped input portion 55 immediately adjacent the discharge end of the transfer tube 44. A rotating tubular drive housing 56 is secured to the forward end of tube 54 and rotatably supported by a front bearing unit 57 and a rear bearing unit 58 upon a supporting base structure 59. The front bearing unit 57 constitutes a combination radial and thrust bearing whereas the rear bearing unit 58 is a radial support. An intermediate concentric tube 60 is mounted intermediate tubes 54 and 56 with suitable spacers 61 interconnecting the forward end of tube 60 to tubes 54 and 56 and defining a cooling passageway to opposite sides thereof. Guide tube 54 and an extension 62 of tube 60 project rearwardly of the end of the drive housing 56 and are interconnected adjacent the input portion 55 by a suitable annular sealing member 63 which threads into the end of the extension 62. Cooling chambers 64 and 65 are thus formed to opposite sides of tube 60 and extension 62. A cooling connector housing 66 is stationarily mounted on structure 59 adjacent the entrance end of the housing 56 and is supported by suitable bearings 67 and 68 on the outer ends of extension 62 and housing 56, respectively. A water inlet 69 and a water outlet 70 are provided in the connector housing 66 communicating with the cooling chambers 64 and 65. The guide tube 54 is thereby water cooled to prevent damaging of the tube from the high temperature of an extruded wire 3.

The forward end of drive housing 56 which is rotated by a motor 71 is also coupled to rotate tube 54 and thereby prevent concentration of heat from the hot extruded wire 3 in one portion of tube 54.

The drive housing 56 is rotated in the illustrated embodiment of the invention by motor 71 which is preferably a hydraulic motor, as follows.

A drive gear 72 is integrally formed with a hub which is secured to the outer end of the drive housing 56 by a suitable key 73 and lock nut 74 which threads onto an exteriorly threaded end portion 75 of the housing 56. The drive gear 72 abuts a shoulder 76 of the housing and is thereby fixedly clamped in place. An input gear 77 is secured to a shaft 78 which projects transversely from the housing through a bearing housing 79 mounted on the supporting base structure 59. Bearing units 80 and 81 are provided in the opposite ends of the bearing housing 79 to support the drive shaft 78. A bearing retainer cap 82 is suitably secured to the housing 79 by bolts 83 to support the assembly. A coupling 84 interconnects the drive shaft 78 to the hydraulic drive motor 71.

A speed control value 85 couples the drive motor 71 to a suitable source of high pressure drive fluid to rotate the shaft 78, as hereinafter described. The hydraulic motor 71 is of any suitable or well known structure adapted to establish either of the two characteristic drives to the drive housing 56 and the attached spinner 52: (1) a high-speed, low-torque drive or (2) a low-speed, high-torque drive.

Figure 7:
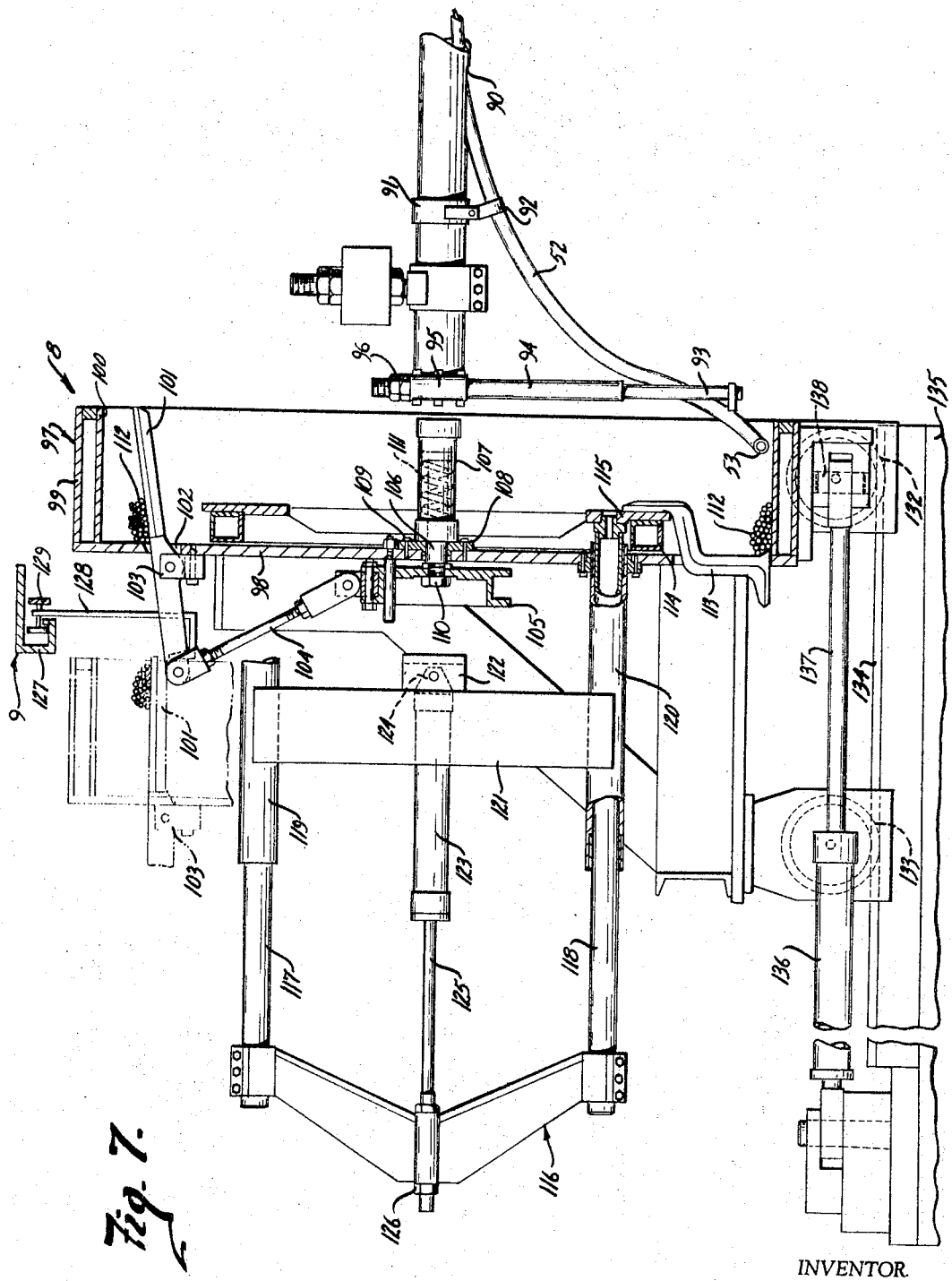
FIG. 7 is a side elevational view of a coil receiving and transferring support assembly.

The winding spinner 52, as shown in FIGS. 1, 6 and 7, is aligned with the terminal end of the central guide tube 54 and housing 56 and is supported by a rotating shaft assembly 86. The shaft assembly 86 includes a flanger 87 which is secured as by bolts 88 to a corresponding flange 89 on the outer end of the drive housing 56.

The spinner 52 extends outwardly through an opening 90 in the shaft assembly 87 and continues outwardly and forwardly terminating in a circumferentially directed discharge end or nozzle 53. As a result, wire 3 is discharged from the winding spinner 52 in a slight axial direction and a substantially circumferential or circular motion within the mandrel 8.

Spinner 52 is supported adjacent the opening 90 by a support bracket 91 and a pivoted or pinned connector 92 to allow adjustment of the discharge nozzle 53 with respect to the mandrel 8. A support arm 93 is secured to spinner 52 just behind the nozzle 53 and extends laterally inwardly with the inner end thereof journaled in a sleeve 94 which is fixed by a bracket 95 to the outer end of shaft assembly 86. Adjustment nuts 96 are threaded onto the back end of supporting arm 93 to properly position the outer end of the nozzle 53 with respect to the mandrel 8.

Figure 8:
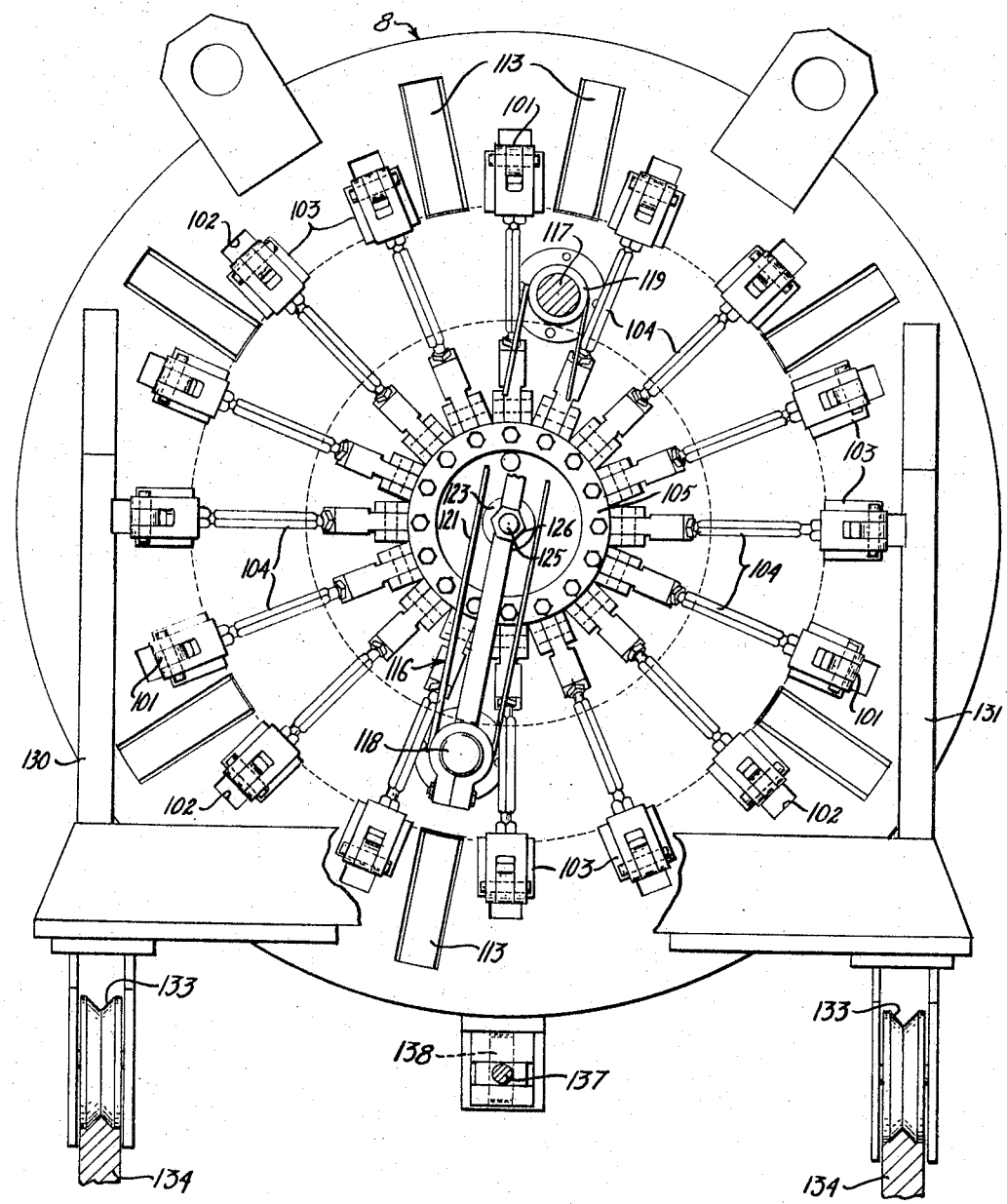
FIG. 8 is an enlarged end elevational view taken from the left side of FIG. 7.

Referring particularly to FIGS. 7 and 8, a mandrel 8 upon which the hot extruded wire 3 is wound is more clearly illustrated and includes a generally cup-shaped mandrel frame 97 which is movably supported, as subsequently described, and opening towards the winding assembly 5. Frame 97 includes a vertical plate-like base 98 and a double-walled peripheral ring formed of radially spaced walls 99 and 100 secured to the base 98. A plurality of pivoting coil fingers 101, shown as sixteen in FIG. 8, are circumferentially distributed and project generally axially through correspondingly located openings or slots 102 in the vertical base 98. Each finger 101 is pivotally mounted intermediate its length by suitable pivot mountings 103 secured to the back side of the vertical base 98 immediately adjacent the corresponding opening 102. The forward ends of coil fingers 101 terminate generally in the vertical plane of the cup-shaped frame 97. The opposite ends of the fingers 101 are pivotally secured to an adjustable link 104 which extends radially inwardly and forwardly toward the center of vertical base 98. The extended or inner end of each link 104 is pivotally attached to the side wall of a positoning control cup 105. The positioning control cup 105 is carried on the outer end of a shaft 106 forming the movable rod or shaft component of a hydraulic operating cylinder 107 which is slidably journaled within a center opening in base 98. A support plate 108 is secured to base 98 by a plurality of bolts 109 and support cylinder 107 to the inside of base 98 with shaft 106 projecting through the aligned opening. Shaft 106 is secured to the base portion of the cup 105 by a clamping bolt 110. Hydraulic pressure from a suitable source, not shown, biases the piston rod 106 to the retracted position to normally hold the rod in the illustrated full line position. As a result, the back ends of the coil fingers 101 are caused to pivot inwardly about the pivot mounting 103 and the forward portion of the fingers 101 within the frame 97 projects radially outwardly, as most clearly shown in FIG. 7. The wire is wound on the fingers 101 to form a wire coil 112.

The cylinder 107 is actuated to collapse fingers 101 to facilitate stripping of the coils 112 from the mandrels 7 and 8. Coil 112 is removed from the mandrel 8 by a plurality of circumferentially distributed stripper fingers 113 which are mounted within the frame 97 by a supporting spider 114. Each finger 113 is secured to an annular edge plate 115 by spider 114 and extends rearwardly and then radially outwardly to the inner face of wall 99. Base 98 is provided with edge slots or openings accommodating the radial portions of the stripping fingers 113. To transfer the coil 112 to conveyor 9, the spider 114 and fingers 113 move relative to the frame 97.

A generally U-shaped frame 116 has a pair of horizontally extending, vertically spaced arms 117 and 118 slidably journaled in supporting sleeves 119 and 120, respectively. The sleeves 119 and 120 are secured within suitable openings in the vertical base 98 of the frame 97 and project rearwardly therefrom with arms 117 and 118 projecting therethrough. The forward ends of arms 117 and 118 are bolted or otherwise secured to the spider plate 115.

The outer portions of sleeves 119 and 120 are interconnected by a vertical support plate 121 which is welded or otherwise rigidly secured to a cross brace 122 forming a part of a supporting structure for mandrel 8. A hydraulic cylinder unit 123 is pivotally secured to the cross brace 122 as at 124 and includes a piston rod 125 projecting rearwardly therefrom and terminating in a bolted attachment 126 to the cross brace portion of the U-shaped frame 116, as most clearly shown in FIG. 7. Actuation of cylinder 123 causes the piston rod 125 to retract and pull the U-shaped frame 116 forwardly thereby moving the stripper fingers 113 forwardly through the cup-shaped frame 97. During forward movement of stripper fingers 113, the coil 112 is engaged and pushed forwardly from the cup-shaped frame 97.

In the illustrated embodiment of the invention, the conveyor 9 includes a track 127 with a plurality of spaced and articulated hooks 128 adapted to be moved in a predetermined path by a conveyor chain 129. In the illustrated embodiment of the invention, the hooks 128 are adapted to move past the winding assemblies in the path of the winding position of mandrels 7 and 8 which are selectively retracted to allow the positioning of a hook 128 in alignment with a wire coil 112, as follows.

The back side of mandrel frame 97 is secured to a pair of generally triangular frame units 130 and 131 which are laterally spaced and aligned with a side edge portion of the frame. Each frame unit 130 and 131 is similarly movably supported by a front wheel 132 and a rear wheel 133 riding on a correspondingly positioned longitudinal track 134 carried by a supporting base 135. The wheels 132 and 133 and track 134 have complementing V-shaped peripheral grooves and upper edges. A hydraulic control cylinder 136 is fixed at one end to base 135 rearwardly of mandrel frame 97. Piston rod 137 of cylinder 136 extends forwardly and is secured at the outer end to depending bracket 138 on the underside of frame 97. A wire coil 112 is removed as follows. The cylinder 136 is actuated to retract the piston rod 137 and pull the mandrel 8 rearwardly on the track 134 until the frame 97 is spaced from the path of hooks 128. Conveyor 9 is operated to move a hook 128 into alignment with the retracted mandrel 8 and particularly coil 112. The hydraulic cylinder 123 is then actuated to move the U-shaped frame 116 and the attached stripping fingers 113 forwardly through cup-shaped frame 97 of mandrel 8 and push the coil 112 onto the aligned hook 138. Conveyor 9 is then actuated to remove the coil from in front of mandrel 8. The stripper fingers 102 are again retracted and the mandrel frame 97 returned to the normal winding position.

The operation of the illustrated embodiment of the invention is briefly summarized as follows.

Referring to FIG. 1, transfer unit 6 is positioned to direct the extruded wire to either of the winding assemblies 4 and 5. In FIG. 1, the transfer unit 6 is shown positioned with the transfer tube 44 aligned with the guide tube 15 for directing of the extruded wire 3 into the winding assembly 5 and onto the mandrel 8. The rotation of the spinner 52 is started prior to the extrusion cycle such that the extruded wire 3 enters the spinner 52 while it is rotating.

The heated billet is positioned in the extrusion press cylinder 12 and extruded through the die by suitable operation of the control unit. The switch 37 and particularly the setting of the actuating rods 38 with respect thereto controls the movement of the spindle valves 23 through 26 and thus closely regulates the rate of movement of the ram 11 and therefore the rate of extrusion of the billet 2. The extruded wire 3 passes rapidly through the guide tube 15 and the transfer tube 44 into the central guide tube 54 of drive portion 51. From the guide tube 54, the hot extruded wire 3 passes through the tubular spinner 52 and is wound upon the fingers 101 of mandrel 8 within the frame 97.

During the extrusion of the billet 2, the hydraulic drive motor 71 is actuated by the control valve to establish a high-speed, low-torque movement of the spinner 52. The speed of the spinner 52 is preferably selected to be just slightly greater than the extrusion speed. This drive characteristic is maintained up to and including the stopping or the termination of the movement of the arm 11. Simultaneously therewith, the spinner 52 will come to rest under the retarding action of the extruded wire 3 due to the very low torque input on the spinner 52. At this point, the punch 17 severs the wire 3 from the butt portion of billet 2. Simultaneously with such severing of wire 3, the hydraulic drive motor 71 is again actuated. However, spinner 52 is initially driven with a low-speed, high-torque input to start the rotational movement of the spinner and the transfer of the terminal portion of wire 3 onto mandrel 8. As the severed end of wire 3 enters spinner 52, the motor 71 reverts to a high-speed input to throw the end of the wire from the spinner and onto the mandrel 8.

Thereafter, transfer unit 6 is actuated to position transfer tube 43 connecting the extursion press 1 to winding assembly 4 and the next extrusion is wound on mandrel 7. During this winding operation, the coil 112 is transferred from mandrel 8 onto the conveyor 9 for subsequent processing. When the winding of the extrusion on the mandrel 7 is completed, the apparatus is again positioned to wind on mandrel 8 during which time the coil in mandrel 7 is transferred to conveyor 9.

The extrusion process and apparatus herein permits forming of wire into lengths of 800 feet wound into a coil.

The present invention provides a particularly advantageous extruding mechanism through the use of a relatively lightweight coiling tube which is driven at a speed similar to but somewhat less than the extrusion speed movement of the wire. The movement of the winding tube is closely regulated, however, in order to prevent disruption of the coiling process. Thus, if the tube, even though lightweight, were driven at an excessive speed, it would tend to tear or separate the wire between the press and the tube. If it moves too slowly, it will interfere with the extrusion and exert a back pressure tending to coil the extrusion wire and cause it to bunch up. The close regulation of the winding speed, in combination with the low inertia forces, provide a desired tension of the wire 3. However, the tension force is not so great as to pull off or separate the wire behind the winding tube. The driving means provides sufficient power to allow the mechanism to go to the extrusion feed rate and to rapidly follow any changes in the extrusion speed. In this manner, it allows for rather violent changes or fluctuations in the speed of the extrusion particularly at the point where the extrusion must be stopped or at least slowed down for severing of the extruded wire from the butt of the extrusion block or billet.

In summary, the hydraulic drive of the winding tube provides a flexible or mushy type control which avoids following of the wire as it is being coiled. The drive system further provides the necessary added torque at the end of the extrusion stroke to wind in or discharge the terminal portion of the extruded wire.

Although vertical disposed mandrels are shown in FIGS. 1–8, they may be horizontal or some other position. A horizontally disposed mandrel assembly is shown in FIGS. 9–11 with an extrusion and transfer unit 6 corresponding to the previous embodiment.

Figure 9:
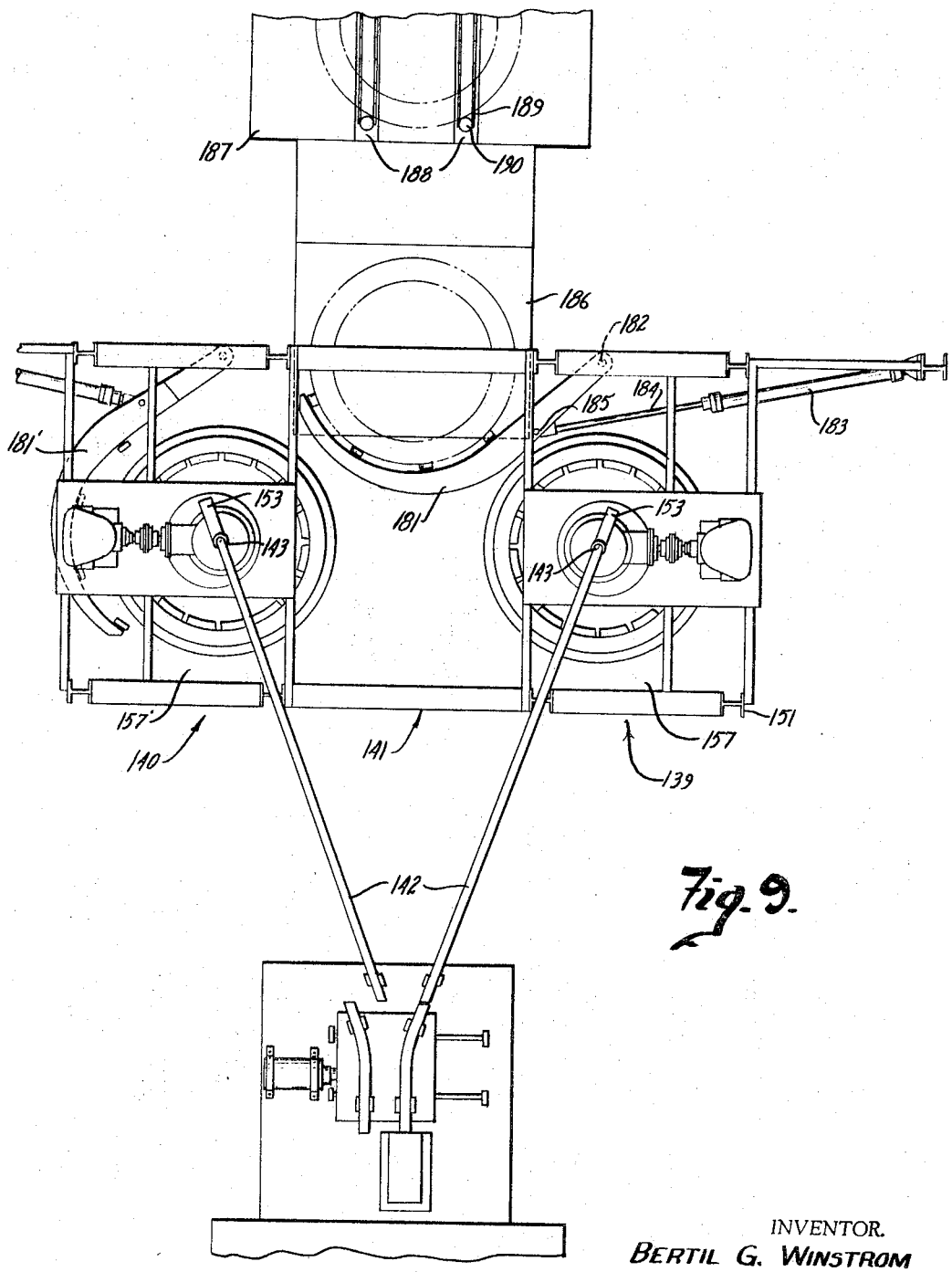
FIG. 9 is a view similar to FIG. 1 of an extrusion system employing a horizontal coiling apparatus.

Referring to FIG. 9, a pair of horizontal winding assemblies 139 and 140 are shown spaced forwardly from the extrusion press 1 and the transfer unit 6 and on opposite sides of a horizontal conveyor 141. The winding assemblies 139 and 140 are shown of the same construction and winding assembly 139 is hereinafter described in detail with corresponding elements of the winding assembly 140 identified by primed numbers.

As shown in the side elevational view of FIG. 10, the winding assembly 139 is generally disposed below the horizontal plane of the extrusion press 1 and transfer unit 6 with a transfer tube 142 extending horizontally from the transfer unit 6 and then curving upwardly and downwardly to a vertically disposed discharge end 143 at the assembly 139. The discharge end 143 is aligned with an inlet tube 144 of the winding assembly 139 which extends downwardly through a drive unit 145 and terminates in communication with a winding tube or spinner 146. Tube 144 and unit 145 may be similar to the drive structure of the first embodiment as shown in FIG. 6 and no further detailed description thereof is given. Unit 145 includes a hydraulic drive motor 147 similarly coupled to rotate the tube 144 and the spinner 146 which may be similarly secured to the unit 145. The spinner 146 is rotatably supported by an arm assembly 147 for directing an extruded wire member 148 into a mandrel 149 to form a horizontally disposed coil 150 on the top thereof. As in the first embodiment, the hydraulic motor 147 is adjustably connected to a suitable source of operating fluid, not shown, and automatically actuated to control the power input or torque to the drive unit 145.

In the second embodiment, the horizontal winding assembly 139 includes a framework 151 having the drive unit 145 mounted on an upper cross plate or support. A support bracket 152 is secured to the top of the drive unit 145 and includes an upper arm 153 extending inwardly into supporting attachment to the discharge end 143 of the transfer tube 142 for holding the latter in precise alignment with the winding assembly inlet tube 44.

The winding tube or spinner 146 is aligned with discharge end of the tube 144 and is connected to the support arm assembly 147a which depends downwardly through the framework 151 by a lateral support 154 and a positioning rod unit 155 as in the previous embodiment.

The spinner 146 is again a lightweight tubular member curving about the shaft assembly 147a with a terminal or discharge nozzle 156 disposed in a horizontal plane within the upper level of the mandrel 149.

The illustrated mandrel 149 includes a horizontal winding table 157 disposed immediately to one side of the conveyor 141 and secured to the supporting framework 151. A coil 150 is wound on table 157 between an outer winding form 158 in the form of an annular wall and an inner winding form 159. The outer winding form 158 projects vertically through an opening 160 in the winding table 157 with the central disc-shaped portion 161 of the winding table 157 separately supported. The winding form 158 includes a depending flange 162 integral with the inner wall thereof which is disposed beneath the level of the table 157 and supports the inner winding form 159.

The inner winding form 159 includes a plurality of similar arcuate segments 163 arranged in circumferentially spaced relation to define an inner annular wall. Each of the arcuate segments 163 extends downwardly through an opening 164 in table 157 and terminates in a pivot connection unit 165 secured by a bracket 166 to the inner portion or face of the depending flange 162 of the outer winding form 158.

A plurality of similar linkages 167 and 168 are generally secured to the outer and opposite sides of flange 162 for raising and lowering of the winding mandrel with respect to table 157. Linkages 167 and 168 are similar in construction and linkage 167 is hereinafter described in detail.

Referring particularly to FIG. 10, the linkage 167 includes a pair of longitudinally spaced V-shaped arms or cranks 169 and 170 and which are similarly pivotally mounted to the framework 151 at their apex, at 171. A vertical link 172 interconnects the one end of the crank 169 to the adjacent portion of the depending flange 162. A second link 173 interconnects the opposite end of the cranks 169 and 170 to each other. The crank 170 is connected to the piston rod 174 of a hydraulic cylinder unit 175 for selective positioning in accordance with the actuation of the cylinder. Rotation of the cranks 169 and 170 in a clockwise direction, as viewed in FIG. 10 lowers the winding form beneath the level of the winding table 151 to allow removal of a finished coil.

Referring particularly to FIG. 11, the openings 164 in the central plate portion 161 are selected to move the arcuate segments to a vertical position as mandrel 159 is lowered, as follows. Opening 164 includes a radially outer wall having an upper slanted wall portion 177 and a lower vertical wall portion 178 and an inner slanted wall 179. The pivot connection 165 of segment 163 is spaced inwardly of the openings 164 such that in the raised position, the arcuate segments 36 pivot to dispose the upper end of the segments circumferentially outwardly of the lower end and define a winding space 180 having a slightly narrower entrance than a base. When the mandrel is retracted, the arcuate segments 163 pivot about their pivot mounting or connection 165 to a substantially vertical position where they can move freely from the coil 150. Further, the pivotal mounting of the segments 163 compensates for the contraction of a coil 150 which occurs when the hot extruded wire 9 therein cools.

Thus, after formation of the coil 150, the mandrel is retracted and the coil 150 rests on the upper surface of the table 157. The finished coil 150 is removed by a sweep arm 181 in the following manner, as shown in FIG. 9.

Sweep arm 181 is a curved member disposed above and in a plane parallel to the table 157. The arm 181 defines a semi-circle generally similar to the outer radius of a coil 150. A pivoting mounting 182 secures one end of arm 181 to the table 157 forwardly of the winding mandrel. In the normal standby position, the sweep arm 181 curves about the outer periphery of the outer winding form 158. An actuating cylinder 183 is secured to the framework and includes a piston rod 184 projecting outwardly and terminating in a pivotal connection 185 to the sweep arm 181 in spaced relationship to the pivotal mounting 182. When the mandrel has been retracted, the cylinder 183 is actuated to extend the piston rod 184 and thereby pivot the sweep arm 181 in a clockwise direction as viewed in FIG. 9. The movement of the sweep arm 181 forces or pushes the coil 150 from the winding table 157 onto an inlet ramp 186 of the conveyor 141.

The conveyor 141 may be of any suitable construction adapted to transport the coils 150 from the winding assemblies. In the illustrated embodiment of the invention, the illustrated conveyor is a conveyor top or platform 187 with a pair of laterally spaced longitudinal slots 188. An endless rotating chain 189 is mounted beneath the conveyor of platform 187 for rotation in the vertical planes of the slots 188. Transport pins 190 are secured to the chains and project outwardly through the slots and above the table 187 of the conveyor. As the chains 189 rotate, the pins 190 move into operative engagement with the outer circumference of the coils 150 deposited on the platform 187 by the sweep arms 181 and slide the coils along the upper surface of the table to a suitable discharge station, not shown.

The horizotnal coiling mechanism of FIGS. 9–11 employs the gravity action of the extruded wire as it is fed from the winding tube. It also permits some simplicity in removal of the coils.

The horizontal coiling mechanism generally functions in the same manner as the first embodiment with the hydraulic motor torque controlled in stepped relation to provide proper driving of the winding spinner 146 and no further description thereof is given.

Additionally, in accordance with the present invention, a severing system can be provided to prevent the necessity for stopping of the winding tube by the provision of a flying shear system, one embodiment of which is shown in FIG. 12.

In FIG. 12, a die and punch portion is diagrammatically shown similar to that shown in FIG. 2. The balance of the extrusion apparatus may be as heretofore described and it is not repeated.

In accordance with this system, a vertical opening 191 for a severing punch 192 is provided. The edge 193 of the opening 191 is curved toward the die to provide an extended recess in the direction of the discharge passageway 194 through which an extruded wire 195 passes. The punch face 196 is slanted with the foremost edge lower than the trailing edge to move into the wire 195. As the extrusion approaches the terminal end, the punch 192 is depressed and results in a progressive severing and downward deforming of the wire 195. The curved opening permits buildup of the wire and movement into discharge opening without interruption of the movement of the extrusion punch.

Continued downward movement of the punch 192 acts to sever the bent over end of the severed extrusion with the slug discharged through the normal bottom opening. The curved entrance allows the butt to be withdrawn through the extrusion chamber.

The present invention thus provides a highly novel and improved means for extruding long lengths of metal members with simultaneous coiling or working thereof.

Various modes of carrying out the invention are contemplated as being within the scope of the following claims particularly pointing out and distinctly claiming the subject matter which is regarded as the invention.

I claim:

1. Apparatus for extruding a heated metal billet into a rod-like element and simultaneously coiling the element, comprising:
   a rotating winding means having an inlet means for receiving said hot rod-like element and an outlet means for discharging the element in a plane generally perpendicular to the rotational axis of the winding means and perpendicular to the axis of extrusion; and
   drive means for rotating said winding means with the speed of said winding means being conjointly responsive to the torque of said drive means and the torque of the extruded element to maintain said element under only slight tension towards the inlet side of the winding means and with the winding means being immediately responsive to, and substantially instantaneously following changes in the speed of the extruded element.

2. In apparatus for extruding a heated metal billet through a die unit into a rod-like element and immediately coiling the element, the improvement comprising:
   a lightweight rotating winding tube disposed to receive the extruded wire from the extrusion die unit, said tube being rotatably supported and formed with a minimum wall thickness to minimize the weight,
   drive means for positively rotating said winding means at high speed, low torque during extrusion of said rod-like element, said drive means being immediately responsive to changes in speed of the rod-like element being extruded, means for severing said rod-like element from said die unit, and means for controlling said drive means to provide a low speed, high torque drive to complete the coiling of said rod-like element after it has been severed from said die unit.

3. In the apparatus of claim 2,
   said drive means having a first drive mode wherein said winding means is driven at a high speed and low torque whereby said winding means rotates at speed dependent upon the extrusion speed and a second drive mode wherein said winding means is driven at a low speed and high torque.

4. In an extruding and horizontal coiling system for simultaneous extrusion of a heated billet and coiling of the resulting hot extruded wire,
   an extrusion means for extruding a heated billet into a wire,
   means to sever the extruded wire from the billet,
   a drive unit having a guide tube positioned to receive the wire from the extrusion means,
   a hydraulic motor means coupled to rotate said guide tube,
   a winding tube assembly having a supporting shaft extending from the drive unit and having a winding tube secured to rotate with guide tube and driven by the drive unit, said winding tube extending outwardly in a curved path and terminating in offset discharge nozzle, control means to control the speed of extrusion, and a second
   control means to energize the motor means in accordance with the extrusion to provide a high speed and low torque drive to the winding tube during the extrusion which is instantaneously responsive to changes in the speed of travel of said extruded wire prior to severing said wire and to provide a low speed and high torque drive to the winding tube immediately after the severing of the wire from the billet and to provide a final high speed drive for winding of the terminal portion of the wire.

5. The coiling system of claim 4 wherein said means to sever the extruded wire forms an integral part of the extrusion means to permit stopping of the extrusion and essentially instantaneous severing of the wire.

6. In an extruding and coiling system for simultaneous extrusion of a heated billet and coiling of the resulting hot extruded wire,
   an extrusion means for extruding a heated billet into a wire,
   a transfer tube for guiding the extruded wire from the extrusion means,
   a drive unit having a guide tube aligned with the discharge end of the transfer tube and having a drive housing secured to said guide tube,
   hydraulic motor means coupled to rotate said housing about the axis of the guide tube,
   means to energize the motor means to have a high speed and low torque output and to have a low speed and high torque output,
   a winding tube assembly having a supporting shaft secured to said housing and extending outwardly therefrom and having a winding tube secured to the shaft with an inlet end aligned with the discharge end of the guide tube, said winding tube in a curved path about the supporting shaft and terminating in a discharge nozzle opening circumferentially about the rotational axis of the winding tube, a winding mandrel including a pair of radially spaced circular walls projecting through openings in a base and interconnected to the back side of said base, the inner of said circular walls being pivotally mounted and diverging outwardly from the table, and means to selectively move the circular walls of said winding mandrel from a coil supporting to a coil discharge position.

7. The coiling system of claim 6 having, said winding mandrel disposed in vertical position to receive the extruded wire, and transfer means movable axially of the mandrel for carrying a wound coil from the winding mandrel.

8. In an extruding and horizontal coiling system for taking a hot semi-plastic extruded wire and coiling thereof as the wire moves from an extrusion press, a transfer tube for extending horizontally from the extrusion press with the tube curved upwardly and then downwardly from the wire receiving end to direct the extruded wire therethrough, a rotating drive unit having a straight guide tube aligned with the discharge end of the transfer tube, and a winding tube aligned with the discharge end of the guide tube to receive the extruded wire and connected to the drive unit to be driven about a vertical axis, said tube projecting downwardly in a curved path and terminating in a generally horizontally disposed discharge nozzle, said nozzle being generally circumferentially directed with respect to said vertical axis.

9. The coiling system of claim 8 having, a horizontally disposed winding form disposed to have the extruded wire deposited therein as said tube rotates, and means to remove a coil from the winding form.

10. In an extruding and horizontal coiling system for simultaneous extrusion of a heated billet and coiling of the resulting hot extruded wire, an extrusion means for extruding a heated billet into a wire, a transfer tube for guiding the extruded wire from the extrusion means, said tube having a horizontal input end and a downwardly opening discharge end, a drive unit having a vertically disposed guide tube aligned with the discharge end and projecting downwardly therefrom and having a drive housing secured to said guide tube at the lower end thereof, hydraulic motor means coupled to rotate said housing about the axis of the guide tube, means to energize the motor means to have a high speed and low torque output and to have a low speed and high torque output, control means responsive to severing of said extruded wire to provide a low speed, high torque drive output from said motor means, a winding tube assembly having a supporting shaft secured to said housing and extending downwardly therefrom and having a winding tube secured to the shaft with an inlet end aligned with the discharge end of the guide tube, said winding tube extending downwardly in a curved path about the shaft and terminating in a horizontal discharge nozzle opening circumferentially about the rotational axis of the winding tube, a winding table disposed beneath said winding tube assembly, a winding mandrel including a pair of radially spaced circular walls projecting through openings in the winding table and interconnected below said table, the inner of said circular walls being pivotally mounted and diverging outwardly from below the table, means to selectively raise and lower said winding mandrel, sweep means adapted to move across the table with the mandrel retracted for moving a coil therefrom, and conveyor means to receive the coils from the sweep means and to transport the coils therefrom.

References Cited
UNITED STATES PATENTS

| Re. 25,526 | 3/1964 | Blake et al. | 72—257 |
| 1,849,044 | 3/1932 | Summey | 72—257 |
| 2,900,073 | 8/1959 | Blake et al. | 72—257 |

CHARLES W. LANHAM, *Primary Examiner.*

H. D. HOINKES, *Assistant Examiner.*